United States Patent
Kim

(10) Patent No.: US 9,670,560 B2
(45) Date of Patent: Jun. 6, 2017

(54) METHOD FOR LASER HEAT TREATMENT TO IMPROVE FORMABILITY OF ADVANCED HIGH STRENGTH STEELS

(71) Applicant: Hyundai Motor Company, Seoul (KR)

(72) Inventor: Kyung-Bo Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 482 days.

(21) Appl. No.: 14/145,034

(22) Filed: Dec. 31, 2013

(65) Prior Publication Data

US 2015/0075678 A1   Mar. 19, 2015

(30) Foreign Application Priority Data

Sep. 17, 2013   (KR) .................... 10-2013-0111533

(51) Int. Cl.
| | |
|---|---|
| *C21D 1/34* | (2006.01) |
| *C21D 8/00* | (2006.01) |
| *B23K 26/00* | (2014.01) |
| *B23K 101/00* | (2006.01) |
| *B23K 101/18* | (2006.01) |
| *B23K 103/04* | (2006.01) |
| *B23K 103/00* | (2006.01) |

(52) U.S. Cl.
CPC ............ *C21D 1/34* (2013.01); *B23K 26/0006* (2013.01); *B23K 26/0066* (2013.01); *B23K 26/0093* (2013.01); *C21D 8/005* (2013.01); *B23K 2201/006* (2013.01); *B23K 2201/18* (2013.01); *B23K 2203/04* (2013.01); *B23K 2203/50* (2015.10); *C21D 2211/005* (2013.01); *C21D 2211/008* (2013.01); *C21D 2221/00* (2013.01)

(58) Field of Classification Search
CPC .................................. C21D 1/34; C21D 8/005
See application file for complete search history.

(56) References Cited

U.S. PATENT DOCUMENTS

| | | | | |
|---|---|---|---|---|
| 5,529,646 | A  * | 6/1996 | Nakajima ................ | C21D 1/09 148/525 |
| 2003/0106622 | A1 * | 6/2003 | Matsuoka ............ | C21D 8/0226 148/603 |
| 2014/0246129 | A1 * | 9/2014 | Amtmann ................ | C21D 1/09 148/565 |

FOREIGN PATENT DOCUMENTS

| | | |
|---|---|---|
| JP | 2000080439 A | 3/2000 |
| KR | 10-2003-0005591 | 1/2003 |
| KR | 10-2007-0094580 A | 9/2007 |
| KR | 10-0782785 B1 | 12/2007 |
| KR | 10-2011-0040021 | 4/2011 |

* cited by examiner

*Primary Examiner* — Jessee Roe
*Assistant Examiner* — Christopher Kessler
(74) *Attorney, Agent, or Firm* — Mintz Levin Cohn Ferris Glovsky and Popeo, P.C.; Peter F. Corless

(57) ABSTRACT

A method for laser heat treatment of high tensile steel is provided to improve for improving formability. The method includes performing a heat treatment by irradiating a surface of a high tensile steel blank that includes a martensite structure and a ferrite structure with a laser to decrease a fraction of the martensite structure and increase a fraction of the ferrite structure. In addition, the method includes slowly cooling the blank to temper or anneal the heat-treated blank and subjecting the cooled blank to cold press forming.

6 Claims, 2 Drawing Sheets

METHOD FOR LASER HEAT TREATMENT TO IMPROVE FORMABILITY OF ADVANCED HIGH STRENGTH STEELS

CROSS-REFERENCE TO RELATED APPLICATIONS

This application claims priority under 35 U.S.C. §119 to Korean Patent Application No. 10-2013-0111533, filed on Sep. 17, 2013, in the Korean Intellectual Property Office, the disclosure of which is incorporated herein by reference in its entirety.

BACKGROUND

1. Field of the Invention

The present invention relates to a method for improving formability of a part made of advanced high strength steels and difficult to form, and more particularly, to a method for improving formability through a heat treatment and the like by irradiating a part made of advanced high strength steels and difficult to form with a laser.

2. Description of the Related Art

Recently, research interests in the steel industry and the automotive industry have been focused on improved strength and lightweight, and as the vehicle design has become complex and consumers' needs have been diversified, advanced high strength steels and the like having high strength and improved processability and formability are required. In particular, for advanced high strength steels used in vehicles, safety and the like accompanied by improved strength based on the trend have been considered to be important, and energy reduction accompanied by lightweight has also been considered to be important. In addition, as consumers' needs for design have been diversified and complex, a high-quality steel plate with sufficient formability is required, but advanced high strength steels in the related art have a limitation in being applied to parts which require complex forming due to low formability.

More specifically, the advanced high strength steels for a vehicle refers to a material having a tensile strength of about 590 MPa or more, is classified into dual phase steels composed of ferrite and bainite, TRIP steels composed of ferrite, bainite and residual austenite structures, and complex phase steels composed of complex structures of martensite, residual austenite, ferrite, bainite, and the like, and is selectively applied based on the purpose for each vehicle part. However, one of the greatest drawbacks of the advanced high strength steels is the limitation in being extensively applied to a part that may be difficult to form and the like due to low formability or a low elongation. Accordingly, there is a problem in applying the advanced high strength steels to vehicles.

Attempts have been made to improve formability of the advanced high strength steels using an induction heat treatment and the like, but since it is difficult to subject the advanced high strength steels to a local heat treatment, heat treatment is performed on the entire advanced high strength steels, and thus the overall strength may decrease due to an increase in formability of the advanced high strength steels.

SUMMARY

The present invention provides a method of improving formability of advanced high strength steels using a laser heat treatment temperature, a laser heat treatment speed, a cooling rate and the like.

An exemplary embodiment of the present invention provides a method for laser heat treatment of advanced high strength steels that may include: performing a heat treatment by irradiating a surface of a blank made of advanced high strength steels including a martensite structure and a ferrite structure with a laser to decrease a fraction of the martensite structure and increase a fraction of the ferrite structure; slowly cooling the blank to temper or anneal the heat-treated blank; and subjecting the slowly cooled blank to cold press forming.

The laser may be irradiated through a laser beam head that interworks with an industrial robot which moves while being separated at a predetermined distance. In particular, the advanced high strength steels may be a dual phase steel (DP), transformation induced plasticity steel (TRIP), ferrite-bainitic steel (FB), complex phase steel (CP) or martensitic steel (MS) and the like. A temperature of the heat treatment may be about 500° C. to about 800° C. A rate of the laser heat treatment may be about 5 mm/s to about 20 mm/s. A rate of slowly cooling the blank may be about 20° C./s or less. In addition, the method for laser heat treatment may be applied to advanced high strength steels for a vehicle.

As described above, according to the present invention, since formability of advanced high strength steels may be improved by a range of laser heat treatment temperature, laser heat treatment rate, cooling rate and the like, the advanced high strength steels may be readily applied to a part that is difficult to form. Since the advanced high strength steels may be applied to a part that is difficult to form in a vehicle, a reduced weight may be achieved, fuel efficiency may be improved, and collision performance may be improved. As formability of the advanced high strength steels is improved, production costs may be reduced since cracks, necks, springbacks, and the like may be reduced and the wear of a mold may decrease during cold-press processing, and the lifespan of the mold may increase.

DETAILED DESCRIPTION

Figure 1:
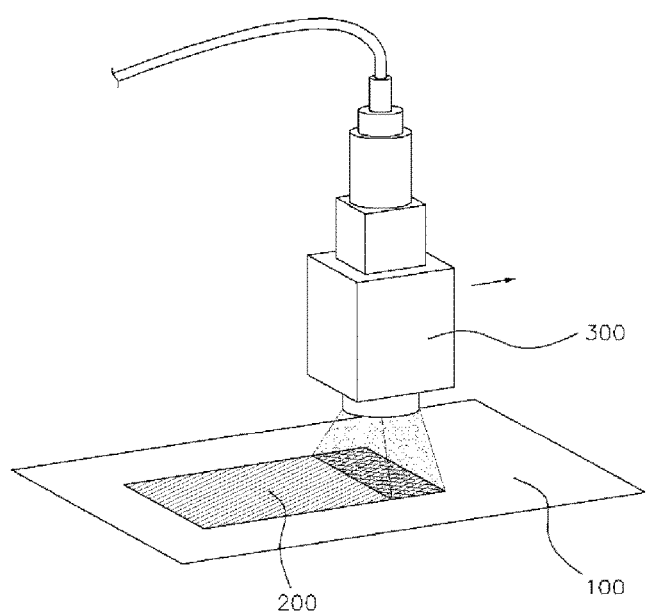
FIG. 1 is an exemplary schematic view illustrating the position of a laser beam head which irradiates laser on a part of a blank that is difficult to form according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Terms or words used in the present specification and claims should not be interpreted as being limited to typical or dictionary meanings, but should be interpreted as having meanings and concepts, which comply with the technical spirit of the present invention, based on the principle that an inventor can appropriately define the concept of the term to describe the invention in the best manner.

The present invention relates to a method for laser heat treatment to improve formability of advanced high strength steels, and the present invention will be hereinafter described in detail.

The present invention is a method for softening a part made of advanced high strength steels and is difficult to form, such as a curvature part, a material inlet part, a stretching part and a trim part, in which cracks and the like are frequently generated while forming, through a local heat treatment using laser to impart different strengths with improved formability. The laser is advantageous since the degree of heat treatment may be freely regulated due to rapid heating and various sizes of the laser beam.

The advanced high strength steels may be high tensile steel for a vehicle and generally refers to a steel having a strength of about 590 MPa or greater and a yield strength of about 300 MPa or greater, and the high tensile steel may be dual phase steel (DP), transformation induced plasticity steel (TRIP), ferrite-bainitic steel (FB), complex phase steel (CP) or martensitic steel (MS) and the like.

More specifically, the method for laser heat treatment according to the present invention may include: performing a heat treatment by irradiating a surface of a blank made of high tensile steel including a martensite structure and a ferrite structure with a laser to decrease a fraction of the martensite structure and increase a fraction of the ferrite structure; slowly cooling (e.g., cooling at a substantially slow pace) the blank to temper or anneal the heat-treated blank; and subjecting the slowly cooled blank to cold press forming.

For heat treatment of a surface of a blank at an exact position in the heat treatment process, the blank may be fixed at a jig. In addition, the temperature of the heat treatment of the blank as high tensile steel, which may be irradiated with the laser during heat treatment, may be about 500° C. to about 800° C. Due to effects of tempering or annealing the blank as advanced high strength steels at the temperature, internal stress of the blank may be reduced and toughness thereof may be increased, and the martensite structure of the blank as high tensile steel may be subjected to a phase transformation process after reaching the austenitizing temperature, and then may be cooled to maintain ductility and the like. In other words, through the heat treatment at the temperature, a martensite structure having a high strength may form a tempered martensite structure in which internal stress may be reduced and ductility may be improved, a fraction of the martensite structure which has substantially low formability due to high strength may be decreased, and simultaneously, and a fraction of the ferrite structure having improved formability due to relatively low strength may be increased, thus improving ductility, formability and the like.

On the other hand, when the temperature of the heat treatment is less than about 500° C., internal stress of the blank as high tensile steel may not be sufficiently removed and it may be difficult for the martensite structure to be phase-transformed into the ferrite structure, and when the temperature of the heat treatment is greater than about 800° C., the strength of the blank as high tensile steel may be further increased by generation of internal stress and the like caused by rapid cooling due to a substantial temperature difference with normal temperature from about 15° C. to about 20° C.

Moreover, FIG. 1 is an exemplary schematic view illustrating the position of a laser beam head 300 which may irradiates a laser on a part 200 that is difficult to form of a blank 100. A laser for heat treatment may be irradiated through the laser beam head 300 that interworks with an industrial robot which may be moved while being separated at a predetermined distance, and the laser may be irradiated from the laser beam head 300 for heat treatment of the part 200 that is difficult to form. The laser which interworks with an industrial robot enables a more precise temperature and a more precise control, and thus a desired heat treatment may be performed on a desired site.

More specifically, the rate of the laser heat treatment, that is, the feed rate of the laser beam head 300 may be about 5 mm/s to about 20 mm/s. When the feed rate is less than about 5 mm/s, the strength of the blank may be further increased by generation of internal stress due to rapid cooling induced by an excessive increase in temperature of the blank as advanced high strength steels, and as a result, formability may be reduced, and when the feed rate is greater than about 20 mm/s, it may be difficult to improve formability of the blank due to the difficulty in the phase transformation of the martensite structure occurring due to failure to perform heat treatment at a sufficient temperature.

Further, the slow cooling may be a process of air-cooling the blank as advanced high strength steels at normal temperature to temper or anneal, and the cooling rate may be about 20° C./s or less. In particular, when the cooling rate is greater than about 20° C./s, carbon may not be sufficiently diffused into a matrix structure of the blank as advanced high strength steels due to induced rapid cooling, the strength of the blank as advanced high strength steels may be further increased, and ductility may decrease, and as a result, formability may be reduced.

EXAMPLE

Hereinafter, the present invention will be described in more detail through the Examples. These Examples are merely for illustrating an exemplary embodiment of the present invention, and it will be obvious to those skilled in the art that the scope of the present invention is not interpreted to be limited by these Examples.

The elongation rate of an Example in which the method for laser heat treatment according to the exemplary embodiment of the present invention was applied to advanced high strength steels having a tensile strength of 980 MPa level, commonly used as a vehicle collision member, was compared with that of a Comparative Example to which the method for laser heat treatment was not applied. More specifically, FIG. 2 is an exemplary graph that compares elongation rates of the Example and Comparative Example, the temperature of the heat treatment in the Example was 650° C., and the rate of the heat treatment, that is, the feed rate of the laser beam head was about 10 mm/s.

Figure 2:
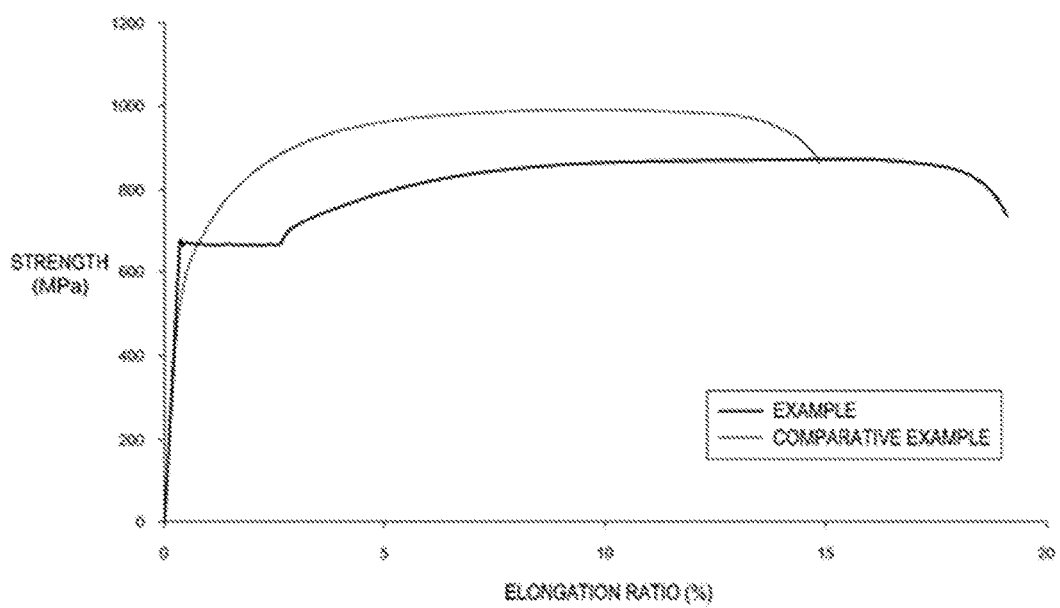
FIG. 2 is an exemplary graph comparing elongation of an exemplary embodiment of the present invention and a Comparative Example according to an exemplary embodiment of the present invention.

As seen in FIG. 2, the elongation rate of the Example to which the method for laser heat treatment according to the exemplary embodiment of the present invention was applied was about 18%, which is greater than about 14% of the elongation rate of the Comparative Example. The elongation difference may be due to the internal stress of the high tensile steel of the Example being reduced by the heat treatment and the phase transformation of the martensite structure occurring, and a high elongation rate may represent increased formability of the high tensile steel.

Figure 3:
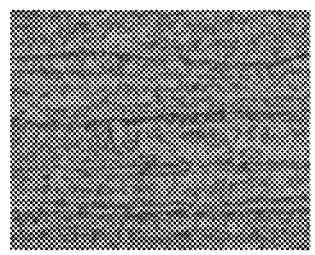
FIG. 3 is an exemplary image of a fine structure of the Comparative Example according to an exemplary embodiment of the present invention.
Figure 4:
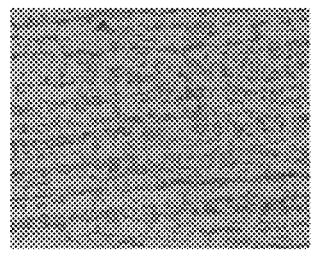
FIG. 4 is an exemplary image of a fine structure of the exemplary embodiment of the present invention.

FIG. 3 is an exemplary image of a fine structure of the Comparative Example, and FIG. 4 is an exemplary image of a fine structure of the Example. In the Comparative Example of FIG. 3, a dark martensite structure and a bright perlite structure that includes a ferrite structure were uniformly distributed, but through FIG. 4 in which the dark martensite structure was reduced and the bright perlite structure that includes the ferrite structure was increased due to the laser heat treatment according to the exemplary embodiment of present invention, the fraction of the martensite structure having low formability was decreased and the fraction of the ferrite structure having high formability was increased.

Therefore, when advanced high strength steels obtained by the method for heat treatment according to an exemplary embodiment of the present invention is subjected to cold press processing, it may be possible to reduce defects, such as cracks and necks due to low formability, which may occur in a part made of advanced high strength steels and difficult to form in the related art, may be reduced, and it may also be possible to reduce springback effects and the like that affect the dimensional stability since yield strength is reduced, and therefore, the method for heat treatment according to an exemplary embodiment of the present invention may improve formability of a part made of advanced high strength steels and difficult to form.

As described above, the present invention has been described in relation to exemplary embodiments of the present invention, but this is only for illustration and the present invention is not limited thereto. The exemplary embodiments described may be changed or modified by those skilled in the art to which the present invention pertains without departing from the scope of the present invention, and various alterations and modifications are possible within the technical spirit of the present invention and the equivalent scope of the claims which will be described below.

What is claimed is:

1. A method for laser heat treatment of steels, the method comprising:
    performing a heat treatment by irradiating a surface of a high tensile steel blank that includes a martensite structure and a ferrite structure with a laser to decrease a fraction of the martensite structure and increase a fraction of the ferrite structure;
    cooling the high tensile steel blank to temper or anneal the heat-treated blank; and
    subjecting the cooled blank to cold press forming.

2. The method of claim 1, wherein the laser is irradiated through a laser beam head which moves while being separated from the surface of the high tensile steel blank.

3. The method of claim 1, wherein the high tensile steel is selected from a group consisting of: dual phase steel (DP), transformation induced plasticity steel (TRIP), ferrite-bainitic steel (FB), complex phase steel (CP), and martensitic steel (MS).

4. The method of claim 1, wherein a temperature of the heat treatment is about 500° C. to 800° C.

5. The method of claim 1, wherein a rate of the heat treatment is about 5 mm/s to 20 mm/s.

6. The method of claim 1, wherein a rate of the cooling is about 20° C./s or less.

* * * * *